July 10, 1951  J. L. MALONE ET AL  2,560,118
FUEL FEEDING APPARATUS FOR GAS DRIVEN TURBINES
Filed April 24, 1945  2 Sheets-Sheet 2

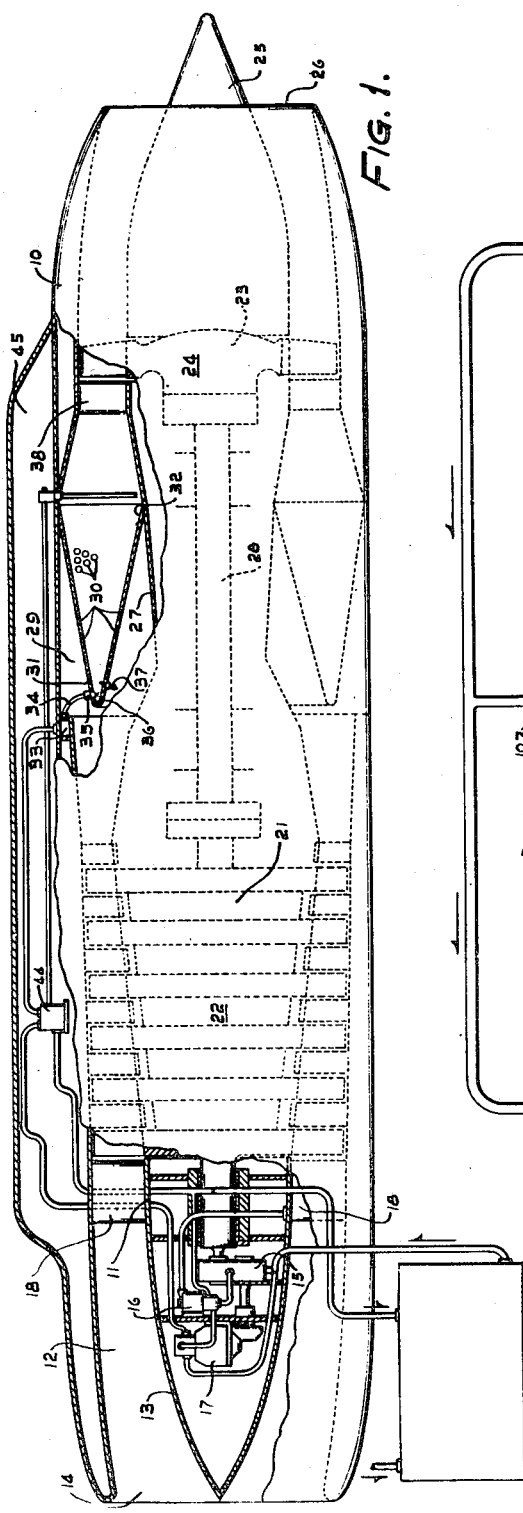
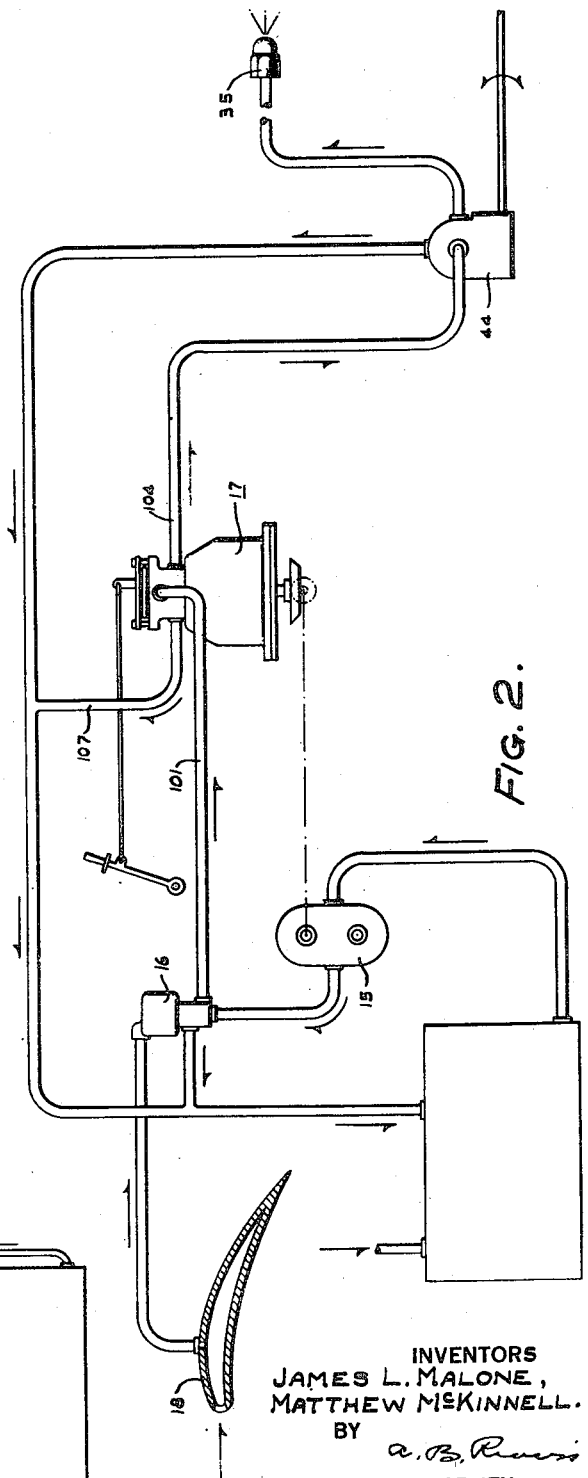

WITNESSES:

INVENTORS
JAMES L. MALONE,
MATTHEW McKINNELL
BY
ATTORNEY

Patented July 10, 1951

2,560,118

UNITED STATES PATENT OFFICE 2,560,118

FUEL FEEDING APPARATUS FOR GAS-DRIVEN TURBINES

James L. Malone, Swarthmore, and Matthew McKinnell, Chester, Pa., assignors, by mesne assignments, to the United States of America as represented by the Secretary of the Navy Application April 24, 1945, Serial No. 589,978

3 Claims. (Cl. 158—36.4)

This invention relates to control devices, more particularly to devices for controlling the supply of fuel to combustion apparatus furnishing heat for operation of a motor, and has for an object to provide improved devices of this character.

Another object of the invention is to provide a novel control responsive to a plurality of forces, one of which forces is derived from the medium being controlled.

The present invention, while not limited thereto, is particularly adapted to be used to control a gas turbine power plant similar to that disclosed in the copending application of Stewart Way, Serial No. 482,533, filed April 10, 1943, now Patent No. 2,405,723, granted August 13, 1946. A power plant of the type disclosed in the mentioned Way application includes an axial-flow air compressor, air heating apparatus, a gas turbine, and a propulsion jet nozzle, all housed in line within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air then being heated in the heating apparatus by the combustion of fuel supported by the compressed air. The resulting motive fluid comprising the products of combustion and the excess compressed air drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a positive displacement pump which is preferably driven by the turbine.

Therefore, yet another object of the invention is to provide, in aircraft propulsion apparatus including a combustion chamber for furnishing heat for operation of a turbine and a pump for supplying fuel to the chamber, a device for controlling the flow of fuel in response to changes in speed of the turbine.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing structure being broken away to show certain details of construction;

Fig. 2 is a diagrammatic representation of the fuel system;

Figure 4:
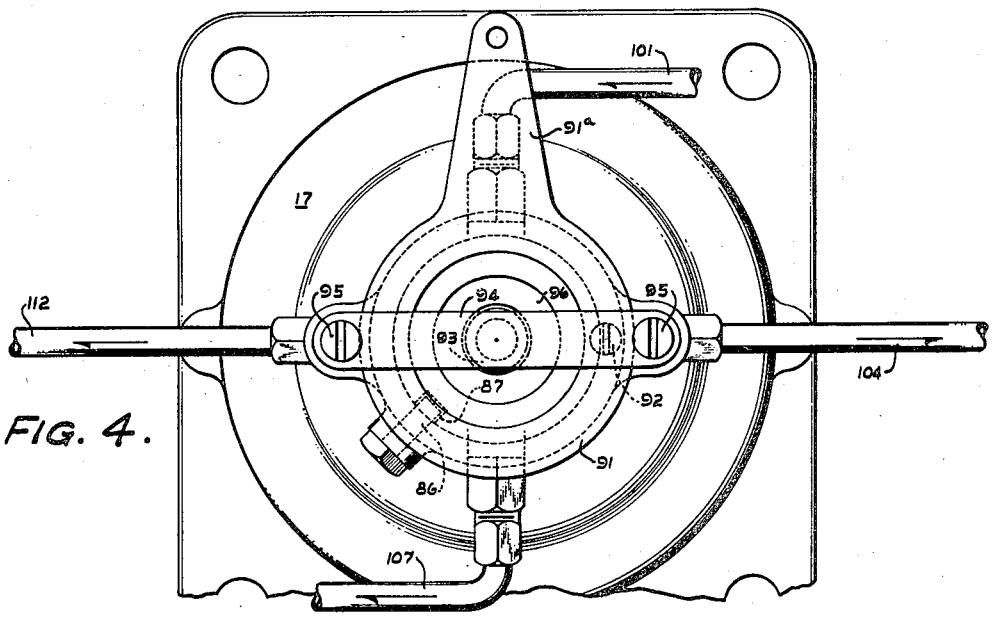
Fig. 4 is a plan view of the structure shown in Fig. 3.

The power plant shrown in Fig. 1 comprises, in general, an outer tubular casing structure 10, open from end to end and having a central core 11 providing, with the casing, an annular flow passage 12, which, if the plant is to be used for propelling an aircraft, is adapted to extend fore and aft with respect to the aircraft. The central core structure 11 is supported by the outer casing structure along its longitudinal axis and includes a hollow fairing cone 13, defining with the forward or left end of the casing 10, as viewed in Fig. 1, an air inlet 14.

The fairing cone 13 houses a fuel pump, generally indicated 15, a barometric fuel control 16, and a speed governor 17, and is supported from the casing 10 by hollow compressor guide vanes 18.

The core 11 also includes the rotor 21 of an axial-flow compressor 22, the fixed blades of which are carried by the casing 10, the rotor 23 of a gas turbine 24, and a longitudinally adjustable conical tailpiece 25 which defines with the rear end of the casing 10 an adjustable propulsion nozzle 26.

The intermediate portion of the core structure between the compressor 22 and the turbine 24 comprises an inner tubular wall structure 27 which houses a shaft 28 connecting the turbine rotor 23 and compressor rotor 21. The inner wall structure 27 defines, with the casing 10, an annular chamber 29 connecting the compressor blade passage and the turbine blade passage.

The chamber 29 is provided with suitable means for heating the air compressed by the compressor. In the embodiment shown, an annular burner tube 31 of conical section and provided with numerous perforations 30, is mounted in the annular chamber 29 with its large open end 32 directed downstream. Fuel is supplied to the burner tube 31 from a manifold 33, connected to a fuel supply as hereinafter described, and is fed through branch pipes 34 to atomizing nozzles 35 extending into the burner tube at spaced points about the periphery thereof adjacent the apex 36. Suitable means, including spark plugs 37 extending into the burner tube, are provided for igniting the air-fuel mixture in the tube.

The present invention is concerned with the specific design of the governor fuel control 17, and not with the details of the remaining apparatus referred to thus far, although such remaining apparatus is preferably constructed in accordance with the disclosure of the above-mentioned Way application.

The power plant operates substantially as follows: Air enters the casing 10 at the inlet 14, is compressed by the compressor 22, and flows into the annular chamber 29, which may function as a diffuser to effect further compression. The compressed air then passes through the openings 30 in the walls of the burner tube 31 and mixes with the atomized fuel supplied by the nozzles 35. The air and fuel mixture is ignited by the spark plugs 37 and burns steadily thereafter. The motive fluid comprising the products of combustion and the excess air flows from the burner tube 31 and is directed by fixed guide vanes or nozzles 38 into the blade passage of the turbine rotor 23. The turbine 24 extracts at least sufficient energy from the motive fluid to drive the compressor 22, pump 15 and other auxiliary apparatus that may be housed in the fairing cone 13. The spent gases leaving the turbine are discharged through the propulsion nozzle 26 at a high velocity so that the remaining energy in the motive fluid is available to propel the aircraft. The tailpiece 25 is preferably axially movable with respect to the casing 10 so that the back pressure on the turbine and the jet effect produced by the nozzle may be varied.

A portion of the fuel supply controls, such as the temperature control 44, may be conveniently housed within a tunnel 45, formed in the top of the casing 10, which tunnel also houses lubricating and fuel oil pipes and ignition wires.

The fuel supply system for the burner tube comprises the pump 15, which is of the constant displacement type and driven by the turbine so that its output is independent of pressure and depends only on the rotational speed of the turbine shaft, the barometric relief valve 16, the shaft-driven speed governor 17, constituting the subject-matter of the present invention, and the temperature limit control valve 44. For a detailed description of the valve 44, reference may be had to U. S. Patent No. 2,404,428 of D. Bradbury, granted on July 23, 1946.

Of the three fuel control devices 16, 17 and 44, herein shown, only the barometric relief valve 16 and the temperature control valve actually by-pass fuel. The governor 17 acts on the fuel supply by reducing the outlet passage, thereby increasing the pressure at the upstream side thereof with the result that more fuel is by-passed at the barometric control 16. For a detailed description of the barometric relief valve, reference may be had to copending application Serial No. 554,992, filed September 20, 1944 and assigned to the assignee of the present application. An abstract of this application was published May 2, 1950 and the application is now abandoned.

Figure 3:
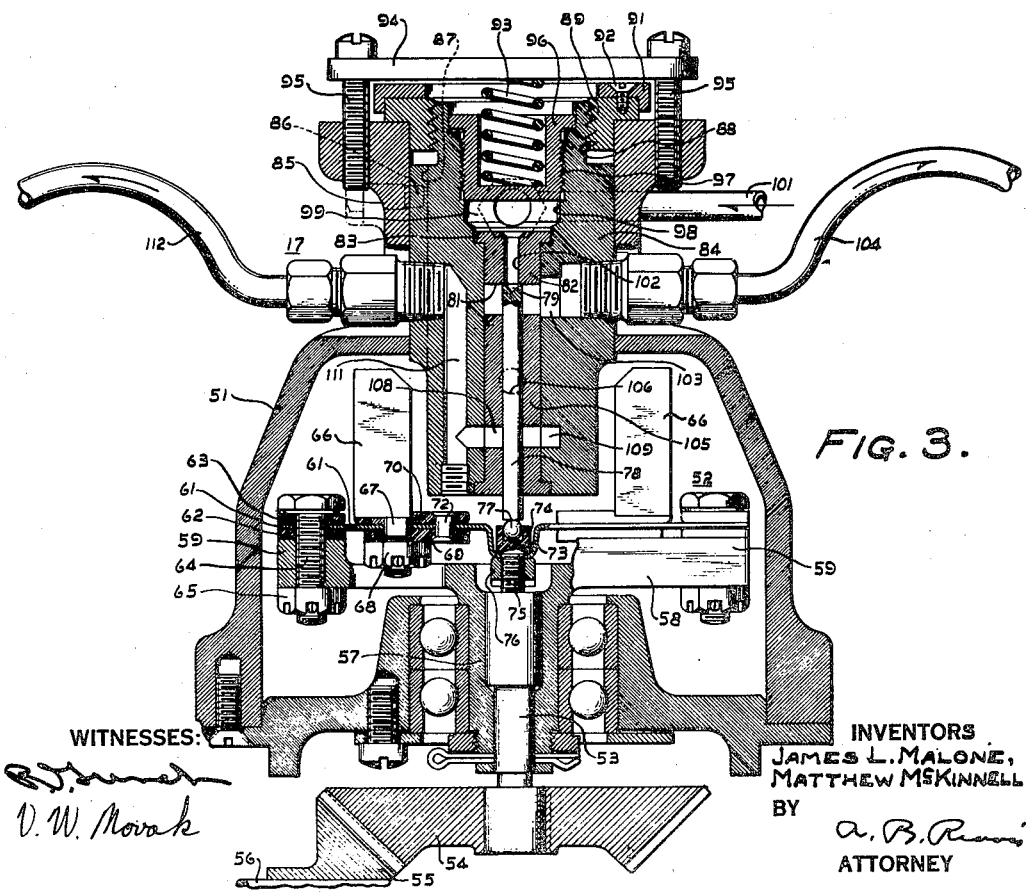
Fig. 3 is an enlarged sectional view of speed governor mechanism.

The governor control apparatus, indicated in its entirety by the reference numeral 17, includes a casing 51 (Fig. 3) adapted to house the governor mechanism, indicated in its entirety by the reference character 52. This governor mechanism comprises a vertical shaft 53 adapted to be rotated by beveled gears 54 and 55, carried by the vertical shaft 53 and a horizontal shaft 56, respectively, the latter shaft being adapted to be rotated by the aircraft prime mover. The vertical shaft 53 carries at its upper end a sleeve 57 depending from an annular weight-supporting structure 58, having an upstanding rim or flange 59 adapted to support a strap or leaf spring 61.

Preferably, the leaf spring 61 has its terminal portions disposed between lower and upper spacing members 62 and 63, respectively, the spacing pieces and the strap terminal portions being secured to the supporting rim or flange 59 by suitable means, such as the bolt 64 and nut 65 threaded thereon.

A pair of elongated weights 66 are mounted on the strap member 61, adjacent the terminal portions of the latter, and are secured thereto by studs 67 and cooperating nuts 68, the studs preferably being formed integral with the weights and extending through the strap and through lower and upper spacer pieces 69 and 70, respectively, disposed at opposite sides of the strap.

Preferably, both ends of the spacer pieces 69 and 70 and the inner ends of the spacer pieces 62 and 63 are rounded to prevent application of undue stresses to the strap 61 during bending of the latter in response to movement of the weights as a result of changes in speed of the governor mechanism. If desired, the spacer pieces 69 and 70 may be further secured to the strap 61 by suitable means, such as the rivets 72.

The strap 61 is provided with a central bent section 73, to which is secured a ball cage 74 by means of an integral stud 75 extending through an opening in the bent portion of the strap and having threaded thereon the nut 76. A ball 77 is mounted in the ball cage 74 and engages the lower end of a valve stem or relay 78 having at its upper end the cup valve 79 adapted to define, in cooperation with the flat valve seat 81 of the valve seat insert 82, an annular orifice through which fuel must pass in flowing from the pump to the combustion apparatus.

The valve seat insert 82 fits snugly in a mating recess or opening 83 formed in the speed changer block 84, the latter being vertically adjustable in the upward extension 85 of the governor housing 51. While the speed changer block 84 can move vertically in the housing extension 85, relative rotation of these two parts is prevented by the pin 86, carried by the housing extension, and extending into the vertical groove 87 formed in the side of the speed changer block.

The upper end of the speed changer block is threaded, as at 88, for engagement with the speed changer nut 89, resting upon the upper edge of the housing extension 85. It will be apparent that rotation of the speed changer nut 89 causes vertical movement of the speed changer block 84, inasmuch as the latter is prevented from rotating by the pin 86, and that such vertical movement of the speed changer block produces a change in the size of the annular orifice between the cup valve 79 and its valve seat 81.

Rotation of the speed changer nut 89 may be effected by any suitable means, such as the speed changer lever 91, having an extension 91a through which it may be moved by suitable mechanism (not shown) by the operator of the aircraft from a remote location.

In order that infinite adjustments of the speed changer block may be obtained, the speed changer lever 91 is connected to the speed changer nut 89 by suitable removable means, such as the screw 92. Obviously, before the screw 92 is put in place, the nut may be adjusted to the approximate desired position and then the screws 92 applied, the speed changer nut 89 then being movable through the limits of the speed changer lever operating mechanism.

All backlash effect in the threads 88 is removed by means of the compression spring 93 which presses upwardly against the bar 94, secured to the casing extension by the bolts 95, and presses downwardly against the bottom of the cup-shaped member 96, which has a threaded connection, at 97, with the bore 98 in the speed changer block, this bore providing, below the cup-shaped member 96, a chamber 99 to which fuel is supplied by the fuel pump through the conduit 101.

Fuel is adapted to pass from this chamber 99 to the annular orifice between the cup valve 79 and its seat 81 through the bore 102 in the valve seat insert 82. Fuel passing through the annular orifice controlled by the cup valve 79 reaches the space 103 communicating through the discharge line 104 with the combustion chamber.

In order to provide for minimum friction of the valve stem 78 with respect to the valve stem bearing sleeve 105, carried by the depending portion of the speed changer block 84, there is provided a double leak-off system around the valve stem 78, this double leak-off system not only minimizing friction but also avoiding leakage of fuel past the valve stem to the adjacent parts of the governor mechanism. To this end, the bearing sleeve 105 is provided with a radial opening 106 communicating through a conduit 107 with the fuel tank, whereby the major portion of the leakage past the valve stem is returned directly to such tank. A radial opening 108 is provided below the opening 106 and communicates with the annular groove or recess 109 in the speed changer block, this annular groove being connected by the passage 111 with the conduit 112 leading to a vacuum pump (not shown) for discharge to the atmosphere of any final leakage.

In operation, the governor operates substantially as follows: Upon an increase in speed of the prime mover, the weights 66 will move radially outward, resulting in flexing of the strap 61 and upward movement of the central portion thereof including the ball 77. This upward movement of ball 77 will produce corresponding upward movement of the relay 78, thereby reducing the cross-sectional area of the annular orifice through which fuel passes from the chamber 99 and passage 102 to the chamber 103. This decrease in cross-sectional area of the annular orifice between the cup valve 79 and its seat 71 will produce a reduction in flow of fuel through the conduit 104 to the combustion chamber of the prime mover with consequent reduction in the speed of the prime mover to an extent sufficient to return the speed of the latter to where it was prior to the increasing in speed causing the change in weight position.

Conversely, upon a drop in speed of the prime mover, the weights will move radially inwardly with consequent lowering of the central portion of the strap 61 and the ball 77 carried thereby. The relay 78 and its associated cup valve 79 will be moved inwardly in following relation to the ball 77 by the pressure of the fuel acting upon the surface of the cup valve, this downward movement of the cup valve increasing the flow of fuel through the annular discharge orifice provided between the cup valve 79 and its seat 81 sufficiently to return the prime mover to its original speed.

It will be apparent that, with the construction herein illustrated, there is provided means, responsive to changes in speed of an aircraft prime mover, for directly acting upon and controlling the supply of fuel to such prime mover.

While we have shown the invention in but one form, it will be obvious to those skilled in the art that it is not so limited; but is susceptible of various changes and modifications without departing from the spirit thereof.

What is claimed is:

1. In apparatus including a gas driven turbine, means forming a combustion chamber for the fuel to provide motive fluid for the gas turbine, a fuel supplying and controlling means, the combination which comprises a fuel container suitable for liquid fuel, a speed governor, conduit means for moving fuel from the container to the speed governor, said speed governor including means defining a pressure chamber into which fuel from the container enters, a fuel outlet conduit communicating with the said chamber, a metering valve having an end portion facing the discharge end of the outlet conduit and a valve stem movable between outlet opening and outlet closing positions, said metering valve controlling the flow of fuel from the pressure chamber, a valve stem bearing in which the valve stem is freely slidable, said bearing having a radial opening through its side in communication with the surface of the valve stem, a return conduit connecting said radial opening and the fuel container, said valve stem being joined at one end to the metering valve which is exposed directly to the pressure of incoming fuel in the pressure chamber which pressure urges said stem and valve toward outlet opening position, and means in driving relation to the turbine and solely responsive to the speed of the turbine for exerting a pressure on the opposite end of the valve stem urging the valve toward its outlet closing position.

2. The combination of claim 1 further defined in that the valve stem bearing has a second radial opening spaced from the pressure chamber, said second opening being in communication with the surface of the valve stem and being more removed from the pressure chamber than the first named radial opening, and evacuating means connected to said second radial opening.

3. A speed governor for controlling the flow of liquid fuel to a power plant, said governor including means forming a pressure chamber, means forming a fuel inlet and a fuel outlet in communication with the pressure chamber, a valve for the pressure chamber said valve positioned to be movable between outlet opening and outlet closing positions, said valve having a valve stem, a valve stem bearing in which the valve stem is freely slidable, said bearing being provided with two radial openings through its side, said radial openings being spaced from the said pressure chamber and each other, means communicating said openings with the exterior of the speed governor, said valve facing said outlet opening and having a pressure area exposed directly to the pressure of fuel in the pressure chamber urging said valve toward its outlet opening position, and means including fly weights and a drive connection for exerting a pressure on the opposite side of the valve through the valve stem urging the valve toward its outlet closing position with a force proportional to the speed that the drive connection is turned, so that increase in the rate of turning of said drive connection when driven by said power plant will reduce the flow of fuel to the power plant and hence reduce the speed of the said power plant.

JAMES L. MALONE.
    MATTHEW McKINNELL.

REFERENCES CITED

The following references are of record in the file of this patent:

UNITED STATES PATENTS

| Number | Name | Date |
|---|---|---|
| 1,330,788 | Couture | Feb. 17, 1920 |
| 1,556,293 | Martin | Oct. 6, 1925 |
| 1,900,385 | Kahr | Mar. 7, 1933 |
| 1,906,334 | Rathbun | May 2, 1933 |
| 2,378,178 | Blazer | June 12, 1945 |
| 2,385,201 | Gottlieb | Sept. 18, 1945 |
| 2,411,065 | Sylvester | Nov. 12, 1946 |
| 2,412,289 | Pugh et al. | Dec. 10, 1946 |
| 2,440,328 | Doble | Apr. 27, 1948 |

FOREIGN PATENTS

| Number | Country | Date |
|---|---|---|
| 526,998 | Great Britain | Sept. 30, 1940 |